(12) United States Patent
Bakman et al.

(10) Patent No.: US 6,558,782 B1
(45) Date of Patent: May 6, 2003

(54) FLEXIBLE GRAPHITE SHEET AND METHOD OF PRODUCING THE SAME

(75) Inventors: Anatoliy S. Bakman, La Crescenta, CA (US); Akira Kubo, Stevenson Ranch, CA (US)

(73) Assignee: SGL Technic, Inc., Valencia, CA (US)

( * ) Notice: Subject to any disclaimer, the term of this patent is extended or adjusted under 35 U.S.C. 154(b) by 0 days.

(21) Appl. No.: 09/551,298

(22) Filed: Apr. 18, 2000

(51) Int. Cl.[7] .................................................. B32B 9/00
(52) U.S. Cl. .................. 428/293.4; 428/297.4; 428/367; 428/408; 428/332; 277/938; 277/944; 277/945; 423/445 R; 423/448; 264/640; 264/650; 264/122; 264/175; 264/176
(58) Field of Search .................. 428/408, 367, 428/292.1, 293.4, 297.4, 332, 311.11, 311.51, 317.9; 277/945, 944, 938, 936, 935; 264/640, 650, 109, 122, 176.1, 641; 423/175, 414, 445 R, 447.1, 448; 106/287.27; 526/250, 253, 254

(56) References Cited

U.S. PATENT DOCUMENTS 5,665,212 A * 9/1997 Zhong et al.
5,705,120 A * 1/1998 Ueno et al.
6,174,622 B1 * 1/2002 Thiebolt, III et al.

FOREIGN PATENT DOCUMENTS

JP 49099986 A 9/1974
JP 63098964 A 4/1988

* cited by examiner

*Primary Examiner*—Deborah Jones
*Assistant Examiner*—Wendy Boss
(74) *Attorney, Agent, or Firm*—Blakely, Sokoloff, Taylor & Zafman

(57) ABSTRACT

Flexible graphite article of manufacture made by compressing a mixture of expanded graphite particle and a fluoro-resin including ethylene-tetrafluoroethylene (ETFE) copolymers after additional heat treatment. An article of manufacture of a gasket material made shows enhanced mechanical properties especially after oil immersion and reduced leakage.

12 Claims, 2 Drawing Sheets

US 6,558,782 B1

FLEXIBLE GRAPHITE SHEET AND METHOD OF PRODUCING THE SAME

BACKGROUND OF THE INVENTION

1. Field of the Invention

This invention relates to flexible graphite and articles of flexible graphite.

2. Background

Graphite sheets are generally made from expanded vermicular particles which are compressed to form graphite-based sheets. One typical way to make expanded vermicular particles is to treat flakes of natural graphite with an acid solution then expose the treated flakes to high temperature. This causes the graphite flakes to expand in a direction perpendicular to the crystal plane of graphite atoms (typically referred to in the industry as the "c" direction in crystallographic terminology). A form of a substantially flat, flexible, integrated graphite sheet is made by compressing expanded graphite particles which are at least 80 times that of the original particles under a predetermined load and in the absence of a binder. Each particle can be held together without a bonding element. The density and thickness of the sheet may be varied by controlling the degree of compression.

A graphite sheet made by the process described above shows suitable properties to be used for gasket and seal applications. The normal requirements for gasket and seal applications include compressibility, recovery, resistance to chemical attack, high yield point and low creep value that collectively produce high sealability of gasket material that results in the gasket's ability to inhibit leakage of gas or liquid through a seal. Creep describes the progressive deformation of a material at constant stress. A creep value is measured as a strain after a certain time of applying compressive stress on a material. The yield point or crush point of a material (e.g., gasket material) describes that the highest compressive stress point at which the material will no longer decrease in thickness without also extruding in planar dimensions.

Satisfying the requirements of compressibility, recovery, resistance to chemical attack, high yield point and low creep concurrently to the degree required by commercial applications is hard to accomplish and the properties of the graphite sheet also depend upon the environment in which it is utilized and density and thickness of the products, though graphite exhibits suitable over all properties as a gasket. It is particularly difficult to combine low creep and high conformability. Elastic materials that conform well to rough surfaces tend to creep under high pressure.

Graphite material generally has good chemical resistance. Graphite material, however, also has a high affinity to wetting agents, such as oils. Such affinity contributes to erosion of graphite-based gaskets, for example, in internal combustion engines. Furthermore, the high temperature of this environment makes it easier for oil to penetrate between layers of graphite. Thus, graphite material exposed to an environment where oil is abundant can exhibit a high creep value and low sealability. Graphite sheet consists of layers of carbon atoms which are held together by weak van der Waals forces. This weak force between the atomic layer of the "c" direction may be the source of the leakage when the graphite sheet is used as a gasket and seal because foreign substance can penetrate between these layers of material.

It is known that to reduce penetration and to increase bonds between graphite particles, the graphite material may be impregnated with certain resins.

In the case of gasket applications, however, desirable properties of compressibility and recovery limit the use of resin additives. Similarly, high temperature applications of certain gaskets also limits the range of possible resin additives. In Japanese Patent No. 53-44917, it has been suggested to use polytetrafluoroethylene (PTFE), polychlorotrifluoroethylene (PCFE) or PTFE-hexafluoroethylene copolymers as possible resin additives. In a dry state, it is believed that desirable particle sizes of less than 20 microns of these materials are generally not commercially available. Increasing the density of the sheet by utilizing resin particles of particle sizes of 20 microns or more improves penetration resistance. However, high resin content leads to low recovery and higher creep relaxation that limit the use of gasket material. See John H. Bickform, "Gaskets and Gasketed Joints," 1997, published by Marcel Dekker, Inc., New York.

SUMMARY OF THE INVENTION

An article of manufacture is disclosed. In one embodiment, the article of manufacture includes graphite, such as in an amount of about 90 to 96 percent by weight, and a fluoro-resin including ethylene-tetrafluoro ethylene (ETFE) copolymers. One example includes about 4 to 10 percent of the fluoro-resin. The graphite is intertwined by fibrils of the fluoro-resin. In one aspect, the article of manufacture is a sheet suitable for use as a gasket material. The sheet is suitable for use in the presence of wetting agents, including oil and includes properties of improved tensile strength, sealability and yield point especially in comparison after oil immersion over prior art graphite sheets (e.g., gaskets).

A method is also disclosed. In one embodiment, the method comprises mixing vermicular graphite particles with a fluoro-resin including ETFE copolymers, forming a desired article (such as a sheet) of the mixture, and heating the article to a temperature above the melting point of the ETFE copolymers.

Additional features, embodiments, and benefits will be evident in view of the figures and detailed description presented herein.

BRIEF DESCRIPTION OF THE DRAWINGS

The features, aspects, and advantages of the invention will become more thoroughly apparent from the following detailed description, appended claims, and accompanying drawings in which:

DETAILED DESCRIPTION OF THE INVENTION

An article of manufacture and a method are disclosed. In one aspect, the article is a graphite-based article such as a graphite sheet suitable for use as gasket material. In one aspect of the method, a method of formation is disclosed. In one embodiment, vermicular graphite is combined with fluoro-resin including ETFE. The mixture is compacted and a desired article is formed. The article is heat treated at or above the melting point of the ETFE copolymers.

Figure 1:
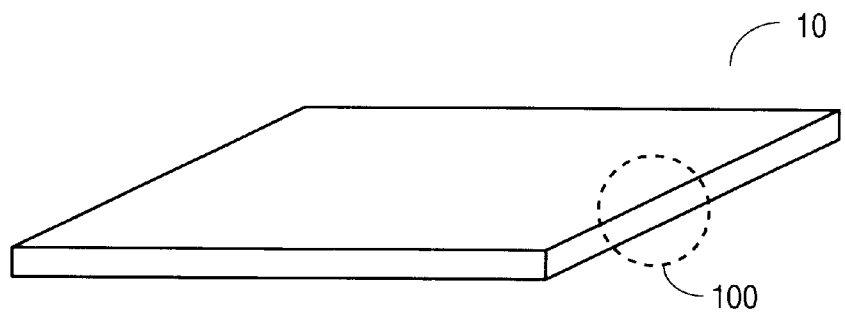
FIG. 1 illustrates a top perspective view of a graphite sheet in accordance with the embodiment of the invention.
Figure 2:
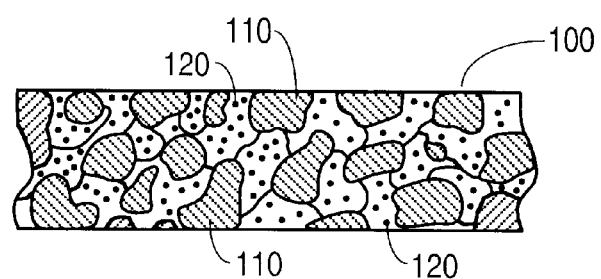
FIG. 2 shows an expanded cross-sectional view of the graphite sheet of FIG. 1.

FIG. 1 illustrates an embodiment of an article of the invention that is graphite-based sheet 10 suitable for applications including, but not limited to, gaskets and seals. FIG. 2 shows an expanded cross-sectional view of sheet 10 at portion 100. As illustrated in FIG. 2, graphite particles previously treated to expand in the "c" direction, are compacted and calendered with fluoro-resin 120. After compacting and calendering, fibrils of fluoro-resin 120 are dispersed between approximately three layers, in this example, of graphite particles 110. In one embodiment, the article is heated to a temperature at or above the melting point of the ETFE copolymers. In this manner, fibrils of fluoro-resin 120 form a network between graphite particles 110 to bond with graphite particles 110 and seal openings between the compacted particles. An article formed by the method of the invention exhibits improved tensile strength and yield point especially during/after oil immersion over prior art graphite articles (e.g., graphite gaskets). In addition, articles formed according to the invention exhibit improved sealability and resistance to wetting agents than prior art articles that results in, for example, low weight gain after oil immersion.

Figure 3:
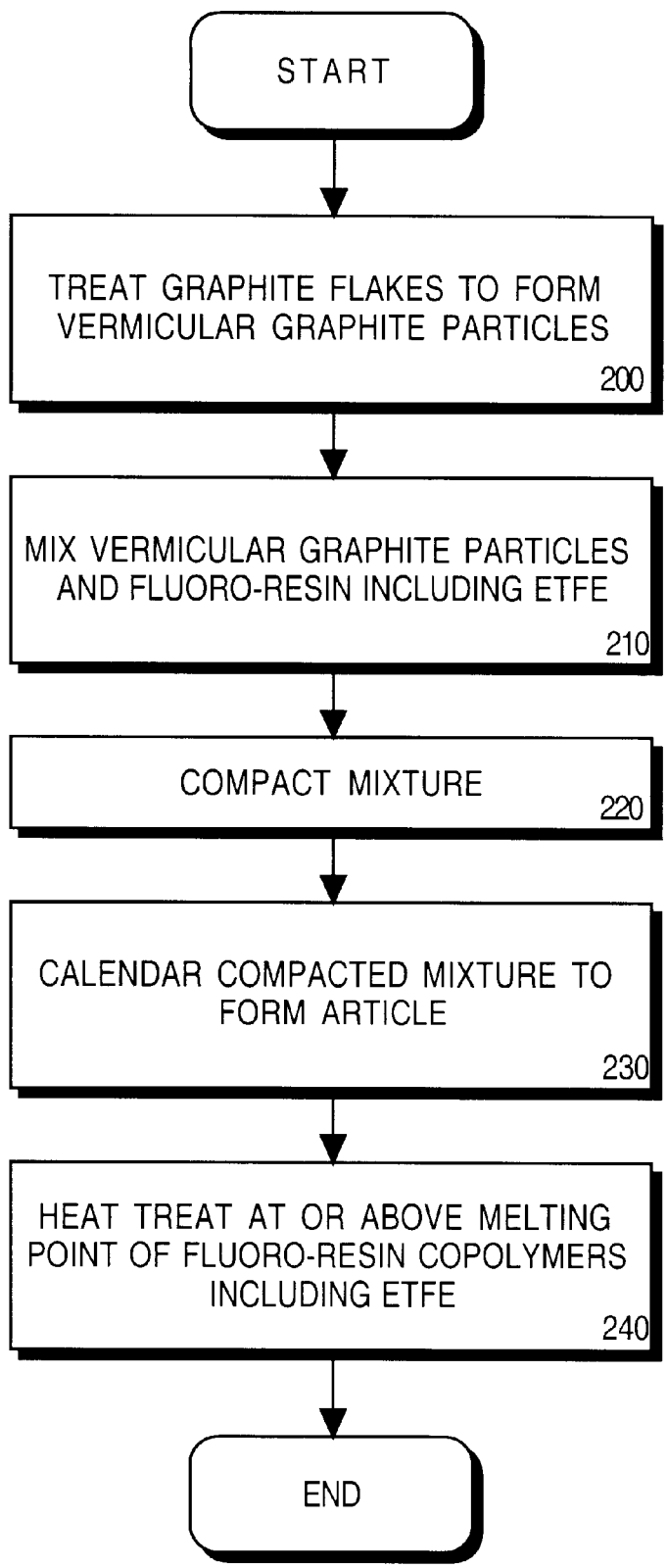
FIG. 3 shows a flow chart for forming an article according to an embodiment of the invention.

FIG. 3 illustrates a flow chart for forming an article according to an embodiment of the invention. In this embodiment, natural graphite flakes are treated with an acid solution such as nitric acid and exposed to a high temperature (e.g., on the order of 840° C. This treatment causes the graphite flakes to expand in a "c" direction perpendicular to the crystal plain of graphite atoms (block 200). In one example, an expansion ratio on the order of 450 mL/g to 550 mL/g is suitable. It is to be appreciated that numerous expansion ratios can be obtained depending on, among other things, the mixture (e.g., amount of oxidation of graphite) and the heat treatment. The treatment produces expanded vermicular graphite particles. The expanded graphite particles in a dry form are measured and mixed with a fluoro-resin including ETFE powder, also in dry form (block 210). A suitable ETFE (fluoro-resin) powder is commercially available from Asahi Glass of Tokyo, Japan. In one embodiment, the mixture includes about 90 to 96 percent graphite particles to about 4 to 10 percent fluoro-resin by weight. The fluoro-resin includes ETFE particles having a particle size on the order of 10 microns or smaller and preferably a particle size on the order of about 5 microns. The mixture is mixed for approximately one to two hours in an effort to establish uniform dispersion of the fluoro-resin, particularly the ETFE powder, throughout the graphite particles. Mixing can be achieved by, among other methods, the use of turbulence in a container or shaking.

Once a suitable mixture is obtained, the mixture is compacted by a predetermined load (block 220). A suitable compacting process to form a graphite-based sheet is a calendaring process. Compacting may be carried out, among other methods, by press machine, such as a hydraulic press/compression press, commercially available from Hackett Pacific Corporation of Ontario, Calif. Compacting the material to a desired density, such as a range of 60–90 lb/ft$^3$ is suitable in one example.

In an embodiment where the article is a sheet such as for use as a gasket, once the mixture is sufficiently compacted, the mixture is subjected to calendering, for example, by a series of calendering rolls to a desired sheet thickness (block 230). For use as a gasket or seal, for example, a suitable sheet thickness may be on the order of 0.02 inches. Once the calendering is completed and a sheet having a desired thickness is formed, the article is heated at a temperature to evaporate gas and moisture. In one embodiment, a calendered sheet is heated at above 100° C. for a long enough time to evaporate gas and moisture to avoid generation of bubbles in the calendered sheet. A suitable time is, for example, on the order of one hour for an 8 inch×12 inch sample.

Once a desired article is formed, the article is heated to a temperature at or above the melting point of the ETFE copolymers (260° C.) under such temperature for about one hour (block 240). The temperature should be kept below the decomposition point of the ETFE copolymers. The heat treatment causes fluoro-resin fibrils, particularly fibrils of ETFE copolymers, in the article to melt which improve the properties of the formed article.

In the described embodiment, a fluoro-resin including ETFE was mixed with vermicular graphite particles. In another embodiment, a fluoro-resin including ETFE and polytetrafluoroethylene (PTFE) powder can be mixed with vermicular graphite. Mixing PTFE powder alone with vermicular graphite particles generally does not yield desired results because of generally coarser powder particles (more than 20 µm) available on the market and higher viscosity of melted PTFE in the layers of graphite. Mixing with PTFE alone generally results in a non-uniform distribution of the fluoro-resin after heat treatment. ETFE generally does not display such characteristics when it is heated above its melting point, allowing the penetration of ETFE to be established throughout the graphite particles. Further, ETFE generally has a wider range between its melting point and its decomposition point than PTFE, which leads to an easier control over heat treatment temperatures.

The following examples illustrate the properties of a graphite-based sheet according to embodiments of the invention.

EXAMPLE 1

Natural graphite flakes were treated with nitric acid and the treated flakes were heated at about 840° C. and expanded by the expansion ratio of between 450 ml/g to 550 ml/g. The expanded graphite particles were collected and mixed with ETFE powder having a 4 micron particle size in a mixer for about 1.5 hours. After the uniform distribution of the ETFE powder in the graphite particle is assured by examination under an optical microscope, the mixture was compacted by a press machine.

The compacted mixture was calendered to 0.02 inch thick sheets, 12 inches in length and 8 inches in width and a density of 70 lb/ft$^3$. The tensile strength and the sealability was measured for the graphite sheet sample with 4, 8, and 10 weight percent of ETFE with the results shown in Table 1. Tensile strength test results of the graphite sheet made without ETFE powder is also included in Table 1. The same pieces of graphite sheets were immersed in oil (IRM 903, a test oil commercially available from Penreco of Los Angeles, Calif.) for five hours at 212° F. and then weight gain was measured. Finally, yield point after oil immersion was evaluated.

TABLE 1

| % by weight of ETFE powder | Tensile strength [psi] | Sealability (ASTM PS 56-96) [ml/min] | Weight gain from oil immersion (ASTM D-471 #9, IRM 903 oil), [%] | Yield point after oil immersion (DIN 28090-1), [MPA] |
| --- | --- | --- | --- | --- |
| 0 | 713 | 0.76 | 44.4 | 13 |
| 4 | 1182 | 0.07 | 24.2 | 13.2 |
| 8 | 1519 | 0.04 | 11.6 | 36.7 |
| 10 | 1780 | 0.03 | 3.7 | 77 |

As shown above, tensile strength and yield point increase as the amount of ETFE powder added increases but leakage and weight gain decreases as the addition of ETFE powder increases. As a result, sealability generally improves as the content ETFE powder increases.

EXAMPLE 2

Graphite sheets were made by the same method described in EXAMPLE 1 by using ETFE powder having a 20 micron particle size. The results of tensile strength and sealability are compared in Table 2.

TABLE 2

| Particle size [μ] | % by weight of ETFE powder | Tensile strength [psi] | Sealability (ASTM PS 56-96) [ml/min] | Weight gain from oil immersion (ASTM D-471 #9, IRM 903 oil), [%] | Yield point after oil immersion (DIN 28090-1), [MPA] |
| --- | --- | --- | --- | --- | --- |
| 4 | 6 | 1501 | 0.06 | 18.7 | 15.4 |
| 4 | 8 | 1519 | 0.04 | 11.6 | 36.7 |
| 20 | 6 | 813 | 0.17 | 34.5 | 11.5 |
| 20 | 8 | 855 | 0.1 | 30.0 | 13.2 |

As shown above, higher tensile strength and yield point are observed in the graphite sheet made with ETFE powder of 4 micron particle size than with the use of 20 micron particle size. Weight gain after immersion in oil is much smaller too when fine ETFE powder was used. Results on leakage demonstrate that sealability of, for example, a gasket made with a 4 micron particle size ETFE powder is more than two times better than one with a 20 micron particle size powder. This demonstrates the effect of the particle size on the distribution of the fluoro-resin particles through the graphite particles.

As the results demonstrated in the two examples indicate, an article of manufacture, including a sheet or gasket, of graphite and a fluoro-resin comprising ETFE copolymers has improved leakage characteristics over prior articles (e.g., a ten-fold improvement). Such a sheet also has improved tensile strength (e.g., on the order of at least a 60 percent increase) over a graphite sheet made without fluoro-resin. Further, the weight gain on oil immersion is reduced from two to ten times or more depending, in part, on the amount of fluoro-resin added.

In the preceding detailed description, the invention is described with reference to specific embodiments thereof. It will, however, be evident that various modifications and changes may be made thereto without departing from the broader spirit and scope of the invention as set forth in the claims. The specification and drawings are, accordingly, to be regarded in an illustrative rather than a restrictive sense.

What is claimed is:

1. An article of manufacture comprising:
   a graphite; and
   a fluoro-resin comprising ethylene-tetrafluoroethylene (ETFE) copolymers, wherein the graphite is intertwined by fibrils of the fluoro-resin, wherein the graphite comprises about 90 to 96 percent by weight of the article of manufacture.

2. The article of manufacture of claim 1, wherein the average particle size of ETFE copolymer powder is on the order of 20 microns or less.

3. The article of manufacture of claim 1, wherein the fluoro-resin further comprises polytetrafluoroethylene.

4. The article of manufacture of claim 1, wherein the article of manufacture comprises a sheet having a thickness suitable for gasket applications.

5. An article of manufacture comprising:
   about 90 to 96 percent graphite; and
   about 4 to 10 percent with an average particle size less than 20 microns of a fluoro-resin comprising ETFE copolymers, combined in solid particulate form, compacted into a sheet, and heated at or above the melting point of the fluoro-resin such that the graphite is intertwined by fibrils of the fluoro-resin.

6. The article of manufacture of claim 5, wherein the fluoro-resin further comprises polytetrafluoroethylene.

7. The article of manufacture of claim 5, wherein the article of manufacture comprises a sheet having a thickness suitable for gasket applications.

8. A method comprising:
   mixing vermicular graphite particles with a fluoro-resin comprising ethylene-tetrafluoroethylene (ETFE) copolymers to establish a uniform disbursion of the fluoro-resin in a mixture;
   forming an article of the mixture; and
   heating the article to a temperature at or above the melting point of the fluoro-resin, wherein the mixture comprises 90 to 96 percent vermicular graphite particles and 4 to 10 percent fluoro-resin.

9. The method of claim 8, wherein the fluoro-resin further comprises an amount of polytetrafluoroethylene.

10. The method of claim 8, wherein forming the article comprises forming a sheet.

11. The method of claim 8, wherein forming the article comprises calendering the mixture to form a sheet.

12. The method of claim 8, wherein the fluoro-resin has a particle size comprising less than 20 microns.

* * * * *